United States Patent
Messingher Lang et al.

(10) Patent No.: US 11,678,111 B1
(45) Date of Patent: Jun. 13, 2023

(54) DEEP-LEARNING BASED BEAM FORMING SYNTHESIS FOR SPATIAL AUDIO

(71) Applicant: Apple Inc., Cupertino, CA (US)

(72) Inventors: Shai Messingher Lang, Santa Clara, CA (US); Symeon Delikaris Manias, Los Angeles, CA (US)

(73) Assignee: Apple Inc., Cupertino, CA (US)

( * ) Notice: Subject to any disclaimer, the term of this patent is extended or adjusted under 35 U.S.C. 154(b) by 45 days.

(21) Appl. No.: 17/348,336

(22) Filed: Jun. 15, 2021

Related U.S. Application Data

(60) Provisional application No. 63/054,924, filed on Jul. 22, 2020.

(51) Int. Cl.
| | |
|---|---|
| H04R 1/40 | (2006.01) |
| G10L 25/30 | (2013.01) |
| G06F 3/01 | (2006.01) |
| H04R 3/00 | (2006.01) |
| G06N 3/08 | (2023.01) |

(52) U.S. Cl.
CPC ............ *H04R 1/406* (2013.01); *G06F 3/012* (2013.01); *G06N 3/08* (2013.01); *G10L 25/30* (2013.01); *H04R 3/005* (2013.01)

(58) Field of Classification Search
CPC ........ H04R 1/406; H04R 3/005; H04R 5/027; H04R 2030/23; G06F 3/012; G06N 3/08; G10L 25/30; H04S 2400/01
See application file for complete search history.

(56) References Cited

U.S. PATENT DOCUMENTS

| | | | |
|---|---|---|---|
| 10,419,867 B2 | 9/2019 | Seo et al. | |
| 2015/0230041 A1* | 8/2015 | Fejzo | H04S 7/303 |
| | | | 381/303 |
| 2016/0073198 A1* | 3/2016 | Vilermo | H04R 3/005 |
| | | | 381/26 |
| 2019/0104357 A1* | 4/2019 | Atkins | G06F 16/61 |
| 2019/0341067 A1* | 11/2019 | Rajendran | G10L 25/30 |

FOREIGN PATENT DOCUMENTS

| | | | | |
|---|---|---|---|---|
| WO | WO-2017129239 A1 * | 8/2017 | ............ | H04R 3/005 |
| WO | 2018211167 | 11/2018 | | |
| WO | 2019121150 | 6/2019 | | |
| WO | 2020046349 | 3/2020 | | |

OTHER PUBLICATIONS

Chen, Jiashu, et al., "External ear transfer function modeling: A beamforming approach," J. Acoust. Soc. Am., 92(4), Pt. 1, Oct. 1992, pp. 1933-1944.

(Continued)

*Primary Examiner* — Yogeshkumar Patel
(74) *Attorney, Agent, or Firm* — Aikin & Gallant, LLP

(57) ABSTRACT

A machine learning model can determine output frequency response at different directions relative to a target audio output format, based on input including frequency response at directions relative to microphones of a capture device. A spatial filter determined based on the output frequency responses is applied to one or more of the microphone signals to map the spatial information from the microphone signals to the target audio output.

20 Claims, 5 Drawing Sheets

(56) References Cited

OTHER PUBLICATIONS

Tashev, Ivan, et al., "A new beamforming design algorithm for microphone arrays," IEEE International Conference on Acoustics, Speech, and Signal Processing Proceedings (ICASSP), Mar. 23, 2005, 4 pages.

Sakamoto, Shuichi, et al., "A 3D sound-space recording system using spherical microphone array with 252ch microphones," Proceedings of 20th International Congress on Acoustics, ICA 2010, Aug. 23, 2010, 4 pages.

Gilbert, Andy, et al., "DeepBlur," Stanford Univeristy, 2016, 1 page.

Gilbert, et al., "Non-Blind Image Deblurring using Neural Networks," Stanford University, 2018, 6 pages.

Wang, Zhong-Qiu, et al., "Combining Spectral and Spatial Features for Deep Learning Based Blind Speaker Separation," IEEE/ACM Transactions on Audio, Speech, and Language Processing, vol. 27, No. 2, Feb. 2019, pp. 457-468.

Xiao, Xiong, et al., "Deep Beamforming Networks for Multi-Channel Speech Recognition," 2016 IEEE International Conference on Acoustics, Speech and Signal Processing (ICASSP), Mar. 20, 2016, pp. 5745-5749.

Ma, Wei, et al., "Phased microphone array for sound source localization with deep learning," Aerospace Systems (2019) 2:71-81, May 14, 2019, pp. 71-81.

Delikaris-Manias, Symeon, "Parametric spatial audio processing utilising compact microphone arrays," Doctoral Dissertations, Aalto University Department of Signal Processing and Acoustics, Nov. 10, 2017, 84 pages.

* cited by examiner

DEEP-LEARNING BASED BEAM FORMING SYNTHESIS FOR SPATIAL AUDIO

CROSS-REFERENCE TO RELATED APPLICATION

This application claims the benefit of U.S. Provisional Patent Application No. 63/054,924 filed Jul. 22, 2020, which is incorporated by reference herein in its entirety.

FIELD

One aspect of the disclosure relates to deep-learning based beam forming synthesis for spatial audio.

BACKGROUND

Humans can estimate the location of a sound by analyzing the sounds at their two ears. This is known as binaural hearing and the human auditory system can estimate directions of sound using the way sound diffracts around and reflects off of our bodies and interacts with our pinna.

Audio capture devices such as microphones can sense sounds by converting changes in sound pressure to an electrical signal with an electro-acoustic transducer. The electrical signal can be digitized with an analog to digital converter (ADC). Beamforming techniques can be applied to microphone signals of a microphone array to extract directional information of the sensed sounds.

Audio can be rendered for playback with spatial filters so that the audio is perceived to have spatial qualities. The spatial filters can artificially impart spatial cues into the audio that resemble the diffractions, delays, and reflections that are naturally caused by our body geometry and pinna. The spatially filtered audio can be produced by a spatial audio reproduction system and output through headphones.

SUMMARY

Classically, recordings by microphone array are combined linearly to produce a desired output playback format such as, for example, stereo. This technique, however, is constrained by linear operations. As a result, some spatial information captured in non-linear relationships between microphone signals might be lost.

A machine learning model, such as, for example, a neural network, can map input recordings to output playback. In other words, the model performs beam-forming synthesis. The machine learning model can provide immersive and improved results by utilizing non-linear techniques such as, for example, non-linear least-squares optimization performed through the machine learning model.

The model can include a perceptually driven cost function that uses figures of merit such as, for example, speech intelligibility and signal distortion ratio. The figures of merit can be included as cost terms in the cost function. The cost function can measure a perceptual difference between the synthesized output of the machine learning model and a target playback. The model can 'map' the input recordings to output playback to minimize the cost function. For example, the model can map multi-microphone recordings by a microphone array to an arbitrary spatial rendering format such as, for example, binaural, circular loudspeaker array, 7.1.4, etc.

In some aspects, a method for spatial audio reproduction includes obtaining a plurality of microphone signals representing sounds sensed by a plurality of microphones. The microphones can have a fixed and known position on a recording device. The method can determine, using as input a frequency response for each of a plurality of directions around each of the plurality of microphones, an output frequency response for each of a plurality of directions associated with audio channels of a target audio output format. This mapping of frequency responses from the input microphone signals to an output format essentially performs beamforming synthesis—combining beams in different directions formed from the input microphone signals to beams relative to an output audio format.

Spatial filter parameters can be determined based on the output frequency responses. For example, the spatial filter parameters can contain gains and/or phase for a range of frequency bands, determined based on the directional frequency responses. In some aspects, the spatial filter parameters also include head related transfer function (HRTF). These parameters can be applied to a one or more microphone signals selected from (or combined) from the microphone signals of the microphone array, resulting in output audio signals for each of the audio channels of the target audio output format. In other words, the output audio signals be used as audio channels that can be used to drive speakers to produce sounds. Such sounds can be perceived by a listener to spatially resemble the sounds as sensed by the plurality of microphones.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Several aspects of the disclosure with reference to the appended drawings are now explained. Whenever the shapes, relative positions and other aspects of the parts described are not explicitly defined, the scope of the invention is not limited only to the parts shown, which are meant merely for the purpose of illustration. Also, while numerous details are set forth, it is understood that some aspects of the disclosure may be practiced without these details. In other instances, well-known circuits, algorithms, structures, and techniques have not been shown in detail so as not to obscure the understanding of this description.

Figure 1:
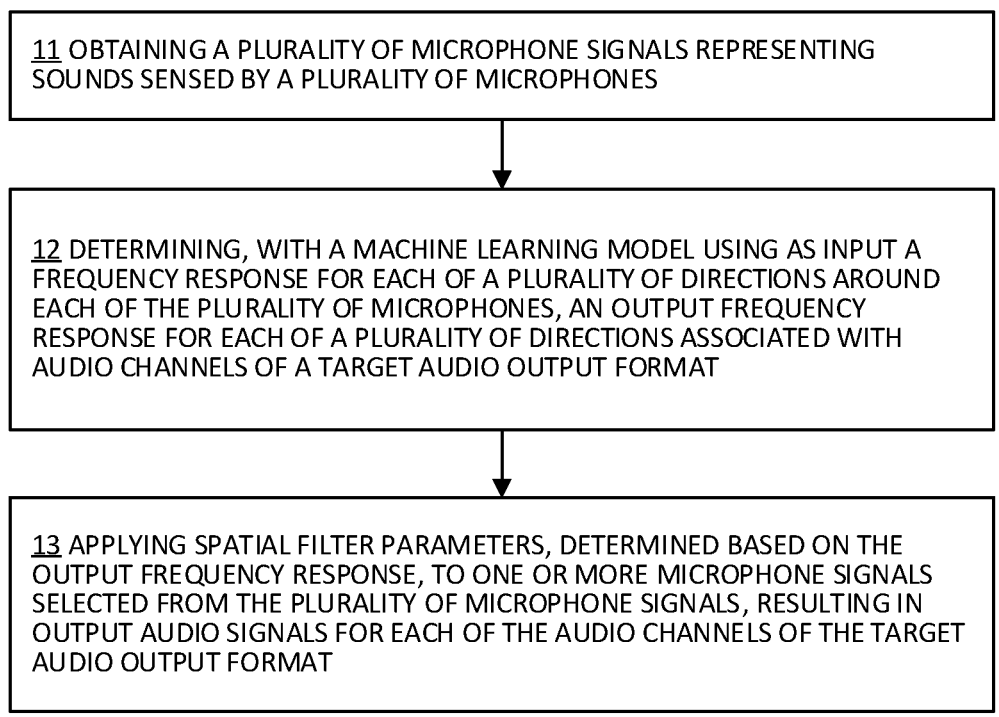
FIG. 1 shows a method for determining spatial information fora target audio output format with a machine learning model, according to some aspects.

A method 10 is shown in FIG. 1 for determining spatial information for a target audio output format with a machine learning model. The machine learning model can include an artificial neural network, for example, a feed-forward neural network with 5-10 layers. Other artificial neural networks can also be applied.

At operation 11, the method includes obtaining a plurality of microphone signals representing sounds sensed by a plurality of microphones. The plurality of microphones can form a microphone array with fixed and known position. The plurality of microphones can be integrated as part of a device such as, for example, a mobile smart phone, a tablet computer, a speaker, a head worn device such as a headphone set, and/or a head-mounted display. A headphone set can have a left earpiece speaker and a right earpiece speaker. The headphone set can have an in-ear, on-ear, or over-ear design.

At operation 12, the method includes determining, with a machine learning model using as input a frequency response for each of a plurality of directions around each of the plurality of microphones, an output frequency response for each of a plurality of directions associated with audio channels of a target audio output format. For example, if the microphone array includes four microphones, then for each of those corresponding microphone signals, a plurality of frequency responses (each associated with a different direction around one of the microphone signals) is used as input to the machine learning model. Continuing with the example, if the target audio output format is binaural, then the machine learning model is trained to compute an output frequency response for each corresponding direction that is associated with the left-ear channel and the right-ear channel of the binaural audio output format.

At operation 13, the method includes applying spatial filter parameters, determined based on the output frequency response, to one or more microphone signals selected from (or a combination of) the plurality of microphone signals, resulting in output audio signals for each of the audio channels of the target audio output format. These output audio signals can be played back through speakers to produce sounds that are perceived by a listener to spatially resemble the sounds as originally sensed by the plurality of microphones of the capture device.

Figure 2:
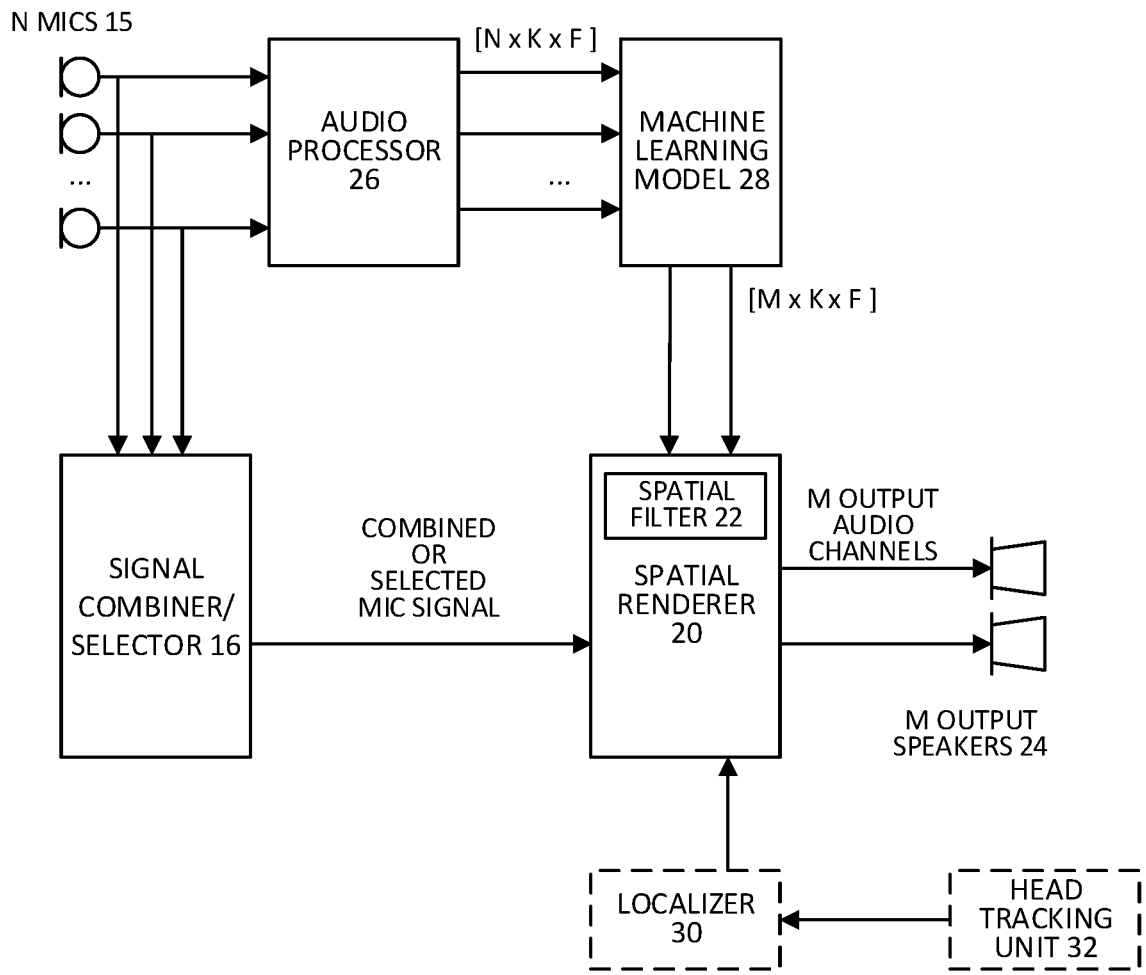
FIG. 2 shows an audio processing system for determining spatial information for a target audio output format with a machine learning model, according to some aspects.

FIG. 2 shows an audio processing system for determining spatial information for a target audio output format with a machine learning model, according to some aspects. The audio processing system can perform the method as described in FIG. 1. A microphone array having N number of microphones 15 produces microphone signals that contain audio information representative of sounds sensed in the environment of the microphone array.

Audio processor 26 can perform beamforming in K directions around each microphone to determine a frequency response in those directions for F frequency bands or bins. Frequency response is the measure of the output spectrum of a system or device in response to a stimulus, and can be used to characterize the dynamics of the system. It can be expressed as a measure of magnitude and phase as a function of frequency. Thus, the audio processor input into the machine learning model 28 can be expressed as a matrix of [N×K×F] frequency responses, where N is the number of mics, K is the number of directions, and F is the number of frequency bands. The number of directions can vary depending on application. For example, for applications where high spatial resolution is desirable, then the K increases. For applications where lower spatial resolution is desirable (e.g., to reduce memory footprint), K can be reduced.

The machine learning model 28 determines [M×K×F] frequency responses for a target output audio format. In other words, a frequency response is determined for each of M output channels for each of K directions for F frequency bands. The machine learning model derives the output frequency responses based on non-linearly combining the input [N×K×F] frequency responses. The machine learning model non-linearly maps the input frequency responses to output frequency responses to minimize a cost function. In some aspects, a non-linear least-squares optimization is performed to determine the corresponding output frequency response of each of the plurality of directions associated with the audio channels of the target audio output format.

Figure 3:
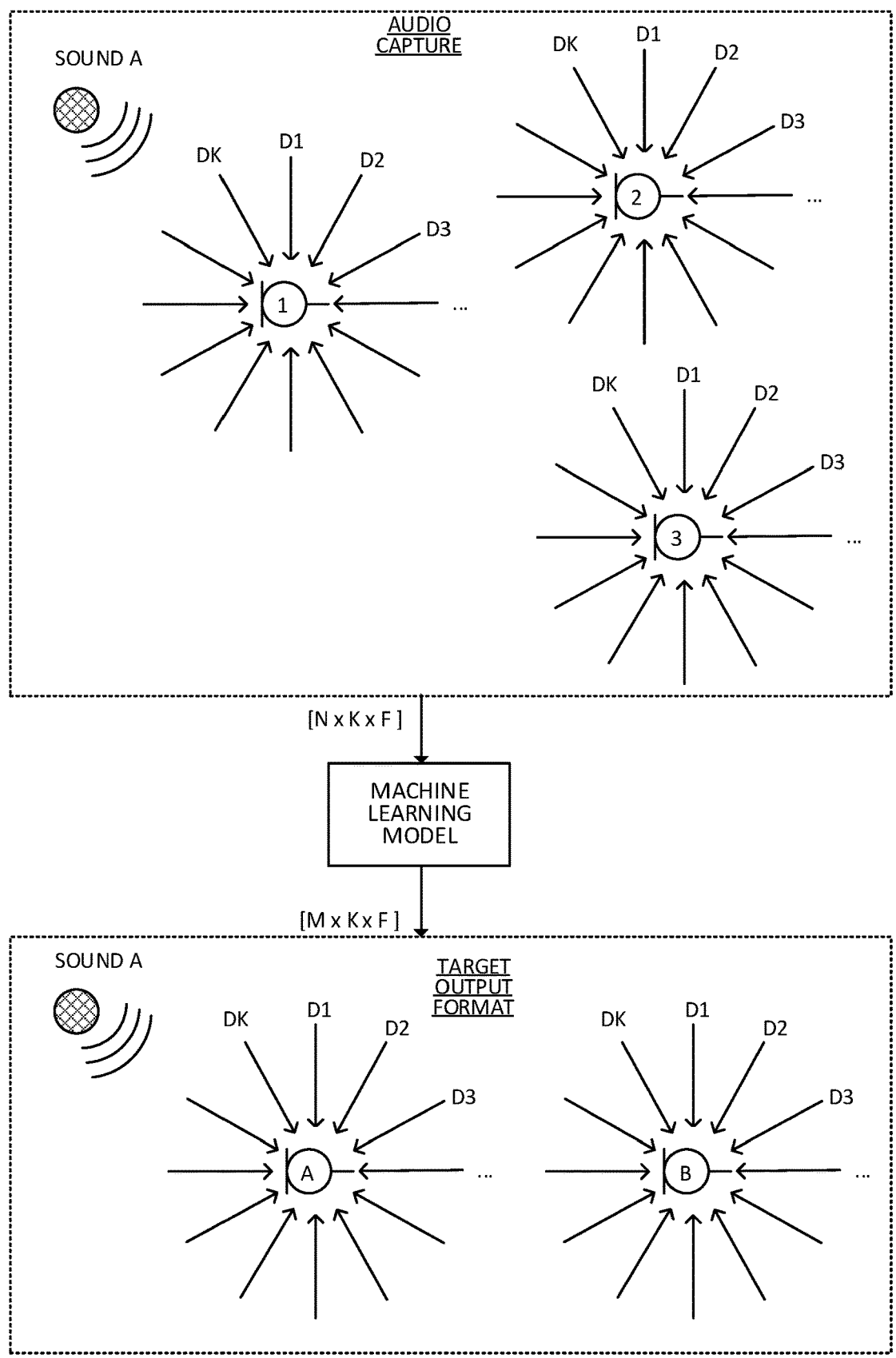
FIG. 3 illustrates input and output of a machine learning model, according to some aspects.

FIG. 3 illustrates input and output of machine learning model (such as, for example, machine learning model 28 in FIG. 2), according to some aspects. Microphones 1, 2, and 3 capture sounds in a sound field, such as, for example, sound 'A' which can be a person talking at a location relative to the three microphones. Frequency responses for each of the microphones at directions D1, D2, D3 . . . to DK are obtained from the microphone signals (e.g. through beamforming) and applied as input to the machine learning model. These directions can be expressed in two-dimensional space or three-dimensional space (e.g., spherical coordinates). As described, the number of directions increases or decreases with respect to a desired spatial resolution and can vary based on application. In some aspects, no additional inputs are required for the machine learning model. For example, the machine learning model does not require, as input, information correlating similarity or strength between the input microphone signals.

The machine learning model can generate respective frequency response values for the directions around a target audio output format. In this example, supposing the target audio output format is binaural, then the input frequency responses can non-linearly generate frequency responses 'around' virtual microphones A and B.

Thus, the audio signals virtually generated by virtual microphone A and B will have spatial qualities that resemble those captured by microphones 1, 2, and 3. In this example, sound 'A' will be heard in the target output format as if the two virtual microphones A and B were placed in the same position as the recording device of microphones 1, 2, and 3.

Referring back to FIG. 2, the machine learning model 28 can non-linearly 'map' the input frequency responses to a target audio output format. The target audio output format is not limited to mono or stereo. In some aspects, non-linear least-squares can be performed to fit a set of 'n' observations (e.g., the input frequency responses) with a model that is non-linear in 'm' unknown parameters (e.g., the output frequency responses). The number of input observations are greater than or equal to the number of unknown parameters, e.g., n≥m. Nonlinear least squares regression can be performed for larger and more general class of functions than for linear least squares. There are fewer limitations regarding how parameters can be used in the functional part of a nonlinear regression model.

The machine learning model can include a cost function (also known as a loss function) that, dun ng training, calculates a difference between the output audio channels and a sample recording of the sensed sounds. The process of minimizing the cost function can be performed as described above using non-linear least-squares to determine the output solution (e.g., the output frequency responses). The cost function can include cost terms to penalize undesirable traits and promote desirable traits. In some aspects, the cost function can include perceptually driven cost terms. For example, the cost function can include a speech intelligibility cost term to promote a favorable speech intelligibility in the solution. Additionally, or alternatively, the cost function can include a signal distortion ratio to promote a favorable signal distortion ratio in the solution. Thus, minimizing of the cost function, and solving for the output frequency responses, will result in a solution that also accounts for speech intelligibility and/or signal distortion ratio. Each cost term can be weighted, and those weights can be adjusted to determine how much emphasis is placed on each of the terms.

A signal combiner/selector 16 selects from or combines the microphone signals to prepare a pre-spatialized candidate signal onto which the spatial filters will be applied to. In some aspects, all microphone signals, a subset of microphone signals, or a combination of some or all microphones can be used. For example, in some aspects, if one of the microphones has the highest signal to noise ratio (SNR), then this microphone signal might be selected for spatialization. Supposing that target output audio format is binaural, then a set of the spatial filters will be applied to the candidate to generate a left channel, and another set of the spatial filters will be applied to the candidate to generate a right channel. In some aspects, the microphone signals can be combined (e.g., added together), to form the candidate. In some aspects, the target output audio output format is one of the following: a binaural output, a 3D speaker layout (e.g., a circular speaker array), and surround loudspeaker layout (e.g., 7.1.4). Depending on the target output audio format, the M output audio channels generated by spatial renderer 20 can be output through M output speakers 24.

Spatial filter parameters 22 of spatial renderer 20 are determined based on the output frequency responses. For example, the spatial filter parameters can contain gains and/or phase for each of a range of frequency bands, determined based on the directional frequency responses output by the machine learning model. In some aspects, the output frequency responses can have head related transfer function (HRTF) 'baked in' based on training of the machine learning model. For example, the machine learning model can be trained to map training set data to binaural recordings that include HRTF spatial cues. Thus, the output frequency responses of the machine learning model can include HRTF spatial cues.

In some aspects, the spatial filter parameters are updated based on the output frequency and a tracked position of a user's head. For example, the machine learning model 28 calculates and provides the spatial renderer with the spatial information in the directions relative to a coordinate system shared with the output audio channels. A head-worn device can be fashioned with a head tracking unit 32, that senses position of the wearer's head. The head tracking unit can include one or more sensors such as, for example, one or more an inertial measurement units (IMU), one or more cameras (e.g., RBD cameras, depth cameras, LiDAR), or combinations thereof. An IMU can include one or more accelerometers and/or gyroscopes.

A localizer 30 can process sensed data from the head tracking unit to determine a position, including a 3D direction (also known as orientation) and/or 3D location, of the user's head. The direction of the user's head can be described in spherical coordinates, such as, for example, azimuth and elevation, or other known or equivalent terminology. Location can be described by coordinates (e.g., x, y, and z) in a three-dimensional coordinate system.

In some aspects, images from a camera of the head tracking unit can be processed with simultaneous localization and mapping (SLAM) or equivalent image processing technology to determine the position of the user's head. Similarly, inertial-aided localization algorithms can process IMU data (including acceleration and/or rotational velocity) to localize the wearer's head. The user's head angle can be determined relative to the directions associated with the frequency responses and the spatial filter. Thus, when the user's head angle moves, the spatial filter can be adjusted to reposition sounds in the virtual audio space.

Figure 4:
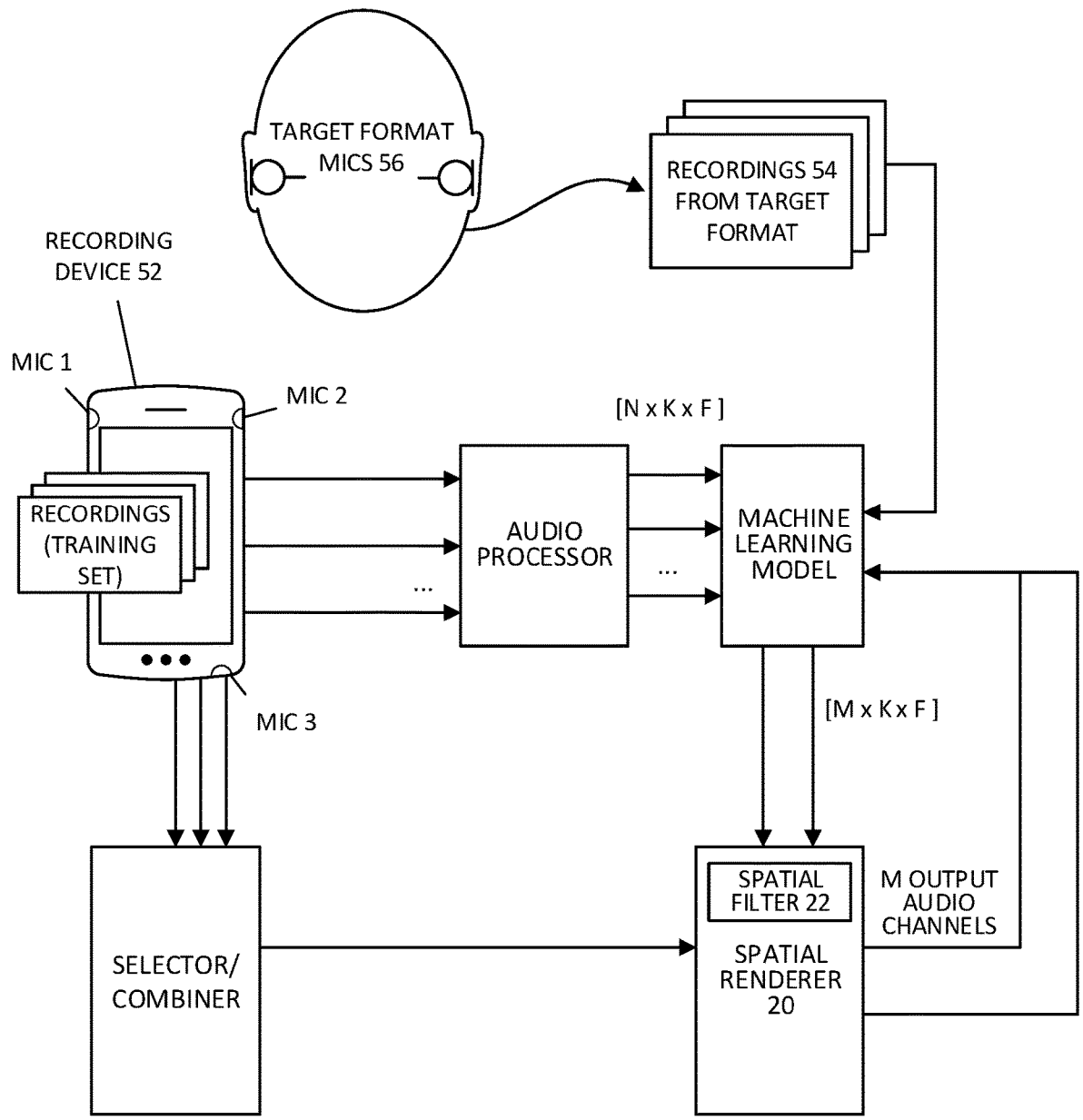
FIG. 4 illustrates training of a machine learning model, according to some aspects.

FIG. 4 shows training of a machine learning model, according to some aspects. The training can be performed using a sufficiently large database of simulated recordings (e.g., greater than 500 recordings). The number of recordings can vary based on complexity (e.g., number of microphone signals, output channels, and spatial resolution.

A recording device 52 having a plurality of microphones arranged that match or resemble a geometrical arrangement of a particular recording device can generate the training set of recordings. For example, if the machine learning model is going to be used to map recordings captured by a smart phone model ABC, then the recording device 52 can either be a) the smart phone model ABC, or b) a set of microphones that resembles the make and geometrical arrangement of the microphones of smart phone model ABC.

The same audio content that is captured with recording device 52 is also captured by microphones 56 having a geometrical arrangement of a target audio output format. For example, if the target audio output format is binaural, then the microphones can be placed at ears of a 'dummy' head to simulate spatial cues (e.g., delays and gains for different frequency bands) caused by the location of the microphones, an anatomy such as the ear, head shape, shoulders, etc. In such a manner, HRTFs can be 'baked in' to the trained machine learning model. The microphones 56 are placed in the same location as the recording device 52 relative to the captured sounds, so that the spatial information maps properly.

Training an artificial neural network can involve using an optimization algorithm to find a set of weights to best map inputs (e.g., the frequency responses associated with the microphones of the recording device 52) to outputs (e.g., the target recordings 54). These weights are parameters that represent the strength of a connection between neural network nodes. The machine learning model can be trained to minimize the difference between the output audio channels generated based on the training set, and the target recordings, (e.g., supervised training).

The training of the machine learning model can include using non-linear regression (e.g., least squares) to optimize a cost function that includes perceptually driven terms, as discussed in other sections. Errors (e.g., between the output and the target recordings) are propagated back through the machine learning model, causing an adjustment of the weights which control the neural network algorithm. This process occurs repeatedly for each recording, to adjust the weights such that the errors are reduced. The same set of training data can be processed a plurality of times to refine the weights. The training can be completed once the errors are reduced to satisfy a threshold, which can be determined through routine test and experimentation. Thus, the machine learning model can be trained to 'map' the spatial information of a particular recording device to a particular format.

Figure 5:
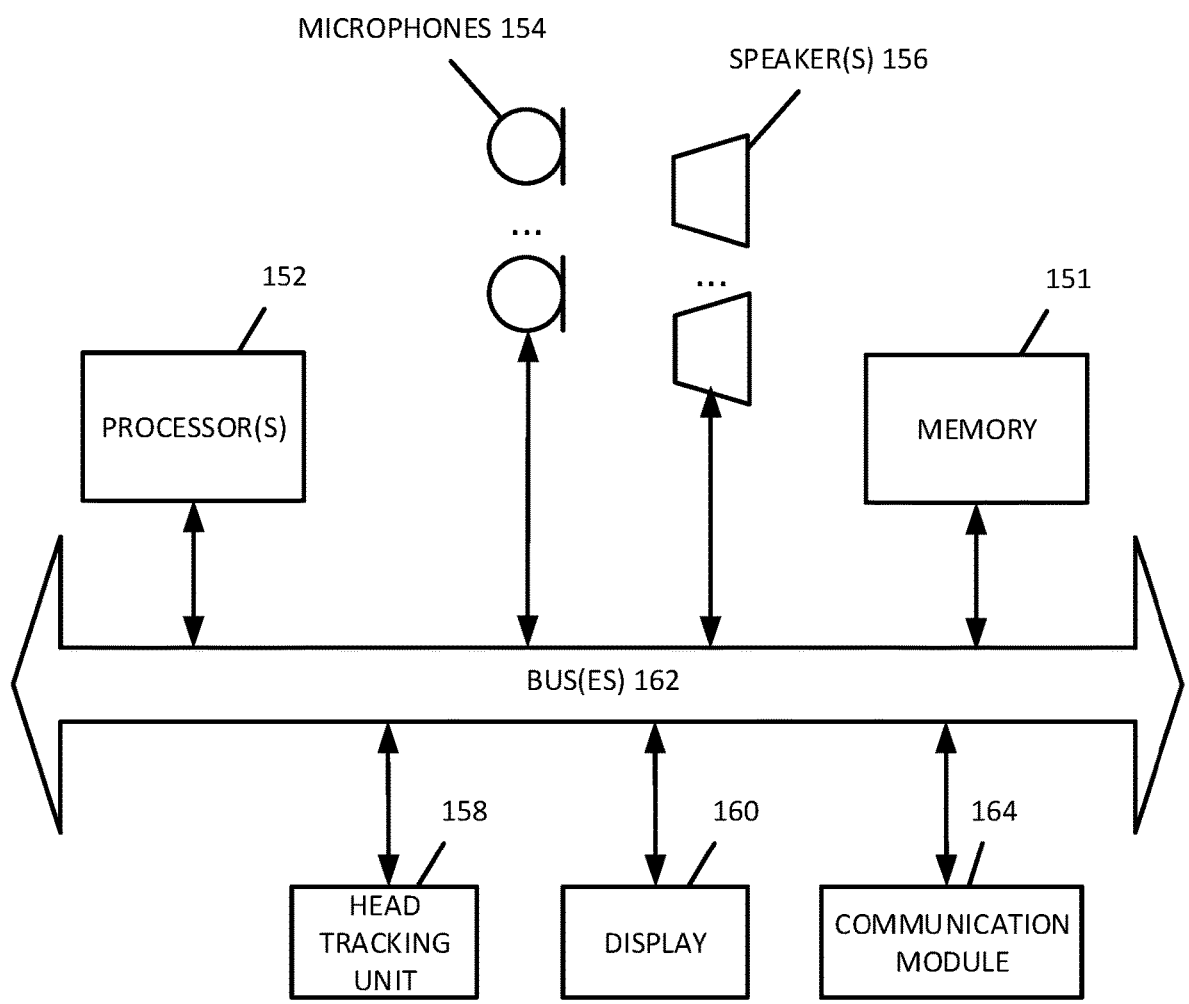
FIG. 5 shows an example audio processing system, according to some aspects.

FIG. 5 shows a block diagram of audio processing system hardware, in one aspect, which may be used with any of the aspects described. This audio processing system can represent a general purpose computer system or a special purpose computer system. Note that while FIG. 5 illustrates the various components of an audio processing system that may be incorporated into headphones, speaker systems, microphone arrays and entertainment systems, it is merely one example of a particular implementation and is merely to illustrate the types of components that may be present in the audio processing system. FIG. 5 is not intended to represent any particular architecture or manner of interconnecting the components as such details are not germane to the aspects herein. It will also be appreciated that other types of audio processing systems that have fewer or more components than shown can also be used. Accordingly, the processes described herein are not limited to use with the hardware and software shown.

The audio processing system 150 (for example, a laptop computer, a desktop computer, a mobile phone, a smart phone, a tablet computer, a smart speaker, a head mounted display (HMD), a headphone set, or an infotainment system for an automobile or other vehicle) includes one or more buses 162 that serve to interconnect the various components of the system. One or more processors 152 are coupled to bus 162 as is known in the art. The processor(s) may be microprocessors or special purpose processors, system on chip (SOC), a central processing unit, a graphics processing unit, a processor created through an Application Specific Integrated Circuit (ASIC), or combinations thereof. Memory 151 can include Read Only Memory (ROM), volatile memory, and non-volatile memory, or combinations thereof, coupled to the bus using techniques known in the art. A head tracking unit 158 can include an IMU and/or camera (e.g., RGB camera, RGBD camera, depth camera, etc.). The audio processing system can further include a display 160 (e.g., an HMD, or touchscreen display).

Memory 151 can be connected to the bus and can include DRAM, a hard disk drive or a flash memory or a magnetic optical drive or magnetic memory or an optical drive or other types of memory systems that maintain data even after power is removed from the system. In one aspect, the processor 152 retrieves computer program instructions stored in a machine readable storage medium (memory) and executes those instructions to perform operations described herein.

Audio hardware, although not shown, can be coupled to the one or more buses 162 in order to receive audio signals to be processed and output by speakers 156. Audio hardware can include digital to analog and/or analog to digital converters. Audio hardware can also include audio amplifiers and filters. The audio hardware can also interface with microphones 154 (e.g., one or more microphone arrays) to receive audio signals (whether analog or digital), digitize them if necessary, and communicate the signals to the bus 162.

Communication module 164 can communicate with remote devices and networks. For example, communication module 164 can communicate over known technologies such as Wi-Fi, 3G, 4G, 5G, Bluetooth, ZigBee, or other equivalent technologies. The communication module can include wired or wireless transmitters and receivers that can communicate (e.g., receive and transmit data) with networked devices such as servers (e.g., the cloud) and/or other devices such as remote speakers and remote microphones.

It will be appreciated that the aspects disclosed herein can utilize memory that is remote from the system, such as a network storage device which is coupled to the audio processing system through a network interface such as a modem or Ethernet interface. The buses 162 can be connected to each other through various bridges, controllers and/or adapters as is well known in the art. In one aspect, one or more network device(s) can be coupled to the bus 162. The network device(s) can be wired network devices (e.g., Ethernet) or wireless network devices (e.g., WI-FI, Bluetooth). In some aspects, various aspects described (e.g., simulation, analysis, estimation, modeling, object detection, etc.) can be performed by a networked server in communication with the capture device.

Various aspects described herein may be embodied, at least in part, in software. That is, the techniques may be carried out in an audio processing system in response to its processor executing a sequence of instructions contained in a storage medium, such as a non-transitory machine-readable storage medium (e.g. DRAM or flash memory). In various aspects, hardwired circuitry may be used in combination with software instructions to implement the techniques described herein. Thus the techniques are not limited to any specific combination of hardware circuitry and software, or to any particular source for the instructions executed by the audio processing system.

In the description, certain terminology is used to describe features of various aspects. For example, in certain situations, the terms "module", "processor", "unit", "renderer", "model", "selector", "combiner", "system", "device", "filter", "localizer", and "component," are representative of hardware and/or software configured to perform one or more processes or functions. For instance, examples of "hardware" include, but are not limited or restricted to an integrated circuit such as a processor (e.g., a digital signal processor, microprocessor, application specific integrated circuit, a micro-controller, etc.). Thus, different combinations of hardware and/or software can be implemented to perform the processes or functions described by the above terms, as understood by one skilled in the art. Of course, the hardware may be alternatively implemented as a finite state machine or even combinatorial logic. An example of "software" includes executable code in the form of an application, an applet, a routine or even a series of instructions. As mentioned above, the software may be stored in any type of machine-readable medium.

Some portions of the preceding detailed descriptions have been presented in terms of algorithms and symbolic representations of operations on data bits within a computer memory. These algorithmic descriptions and representations are the ways used by those skilled in the audio processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio processing system, or similar electronic device, that manipulates and transforms data represented as physical (electronic) quantities within the system's registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined or removed, performed in parallel or in serial, as necessary, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as, special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination hardware devices and software components.

While certain aspects have been described and shown in the accompanying drawings, it is to be understood that such aspects are merely illustrative of and not restrictive on the broad invention, and the invention is not limited to the specific constructions and arrangements shown and described, since various other modifications may occur to those of ordinary skill in the art.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method for spatial audio reproduction comprising:
obtaining a plurality of microphone signals representing sounds sensed by a plurality of microphones;
providing, as input to a machine learning model, a frequency response for each of a plurality of directions around each of the plurality of microphones;
obtaining, from the machine learning model, an output frequency response for each of a second plurality of directions associated with audio channels of a target audio output format; and
applying spatial filter parameters, determined based on the output frequency response, to one or more microphone signals selected from the plurality of microphone signals, resulting in output audio signals for each of the audio channels of the target audio output format.

2. The method of claim 1, wherein the target output audio output format is one of the following: a binaural output, a 3D speaker layout, or surround loudspeaker layout.

3. The method of claim 1, wherein the machine learning model performs a non-linear least-squares optimization to determine the output frequency response for each of the second plurality of directions associated with the audio channels of the target audio output format.

4. The method of claim 1, wherein during training of the machine learning model, a cost function that represents a difference between the output audio signals and a sample recording of the sensed sounds, the sample recording using microphones placed at locations corresponding to the target audio output format, is used to adjust the machine learning model to minimize the difference.

5. The method of claim 4, wherein the cost function includes a speech intelligibility cost term.

6. The method of claim 4, wherein the cost function includes a signal distortion ratio as a cost term.

7. The method of claim 1, wherein the spatial filter parameters are updated based on the output frequency response and a tracked position of a user's head.

8. The method of claim 1, wherein the machine learning model includes a trained neural network that is trained using a plurality of audio recordings recorded with a second plurality of microphones having a geometrical arrangement resembling that of the plurality of microphones.

9. The method of claim 1, wherein speakers are driven with the output audio signals to generate sound that, when perceived by a listener, spatially resemble the sounds as sensed by the plurality of microphones.

10. A spatial audio reproduction system comprising
a processor, configured to perform the following:
obtaining a plurality of microphone signals representing sounds sensed by a plurality of microphones;
providing, as input to a machine learning model, a frequency response for each of a plurality of directions around each of the plurality of microphones;
obtaining, from the machine learning model, an output frequency response for each of a second plurality of directions associated with audio channels of a target audio output format; and
applying spatial filter parameters, determined based on the output frequency response, to one or more microphone signals selected from the plurality of microphone signals, resulting in output audio signals for each of the audio channels of the target audio output format.

11. The spatial audio reproduction system of claim 10, wherein the target output audio output format is one of the following: a binaural output, a 3D speaker layout, or surround loudspeaker layout.

12. The spatial audio reproduction system of claim 10, wherein the machine learning model performs a non-linear least-squares optimization to determine the output frequency response for each of the second plurality of directions associated with the audio channels of the target audio output format.

13. The spatial audio reproduction system of claim 10, wherein during training of the machine learning model, a cost function represents a difference between the output audio signals and a sample recording of the sensed sounds, the sample recording using microphones placed at locations corresponding to the target audio output format, is used to adjust the machine learning model to minimize the difference.

14. The spatial audio reproduction system of claim 13, wherein the cost function includes a speech intelligibility cost term.

15. The spatial audio reproduction system of claim 13, wherein the cost function includes a signal distortion ratio as a cost term.

16. The spatial audio reproduction system of claim 10, wherein the spatial filter parameters are updated based on the output frequency response and a tracked position of a user's head.

17. The spatial audio reproduction system of claim 10, wherein the machine learning model includes a trained neural network that is trained using a plurality of audio recordings recorded with a second plurality of microphones having a geometrical arrangement resembling that of the plurality of microphones.

18. The spatial audio reproduction system of claim 10, wherein speakers are driven with the output audio signals to generate sound that, when perceived by a listener, spatially resemble the sounds as sensed by the plurality of microphones.

19. A non-transitory computer readable medium having stored therein instructions that, when executed by a processor, causes performance of the following:

obtaining a plurality of microphone signals representing sounds sensed by a plurality of microphones;

providing, as input to a machine learning model, a frequency response for each of a plurality of directions around each of the plurality of microphones;

obtaining, from the machine learning model, an output frequency response for each of a second plurality of directions associated with audio channels of a target audio output format; and applying spatial filter parameters, determined based on the output frequency response, to one or more microphone signals selected from the plurality of microphone signals, resulting in output audio signals for each of the audio channels of the target audio output format.

20. The computer readable medium of claim 19, wherein the target output audio output format is one of the following: a binaural output, a 3D speaker layout, or surround loudspeaker layout.

* * * * *